US012748001B2

(12) United States Patent
Sako

(10) Patent No.: US 12,748,001 B2
(45) Date of Patent: Sep. 29, 2026

(54) FORCE DETECTION DEVICE

(71) Applicant: Japan Display Inc., Tokyo (JP)

(72) Inventor: Kazuhiko Sako, Tokyo (JP)

(73) Assignee: Japan Display Inc., Tokyo (JP)

( * ) Notice: Subject to any disclaimer, the term of this patent is extended or adjusted under 35 U.S.C. 154(b) by 250 days.

(21) Appl. No.: 18/735,317

(22) Filed: Jun. 6, 2024

(65) Prior Publication Data

US 2024/0410769 A1 Dec. 12, 2024

(30) Foreign Application Priority Data

Jun. 7, 2023 (JP) ................................ 2023-094103

(51) Int. Cl.

*G01L 1/22* (2006.01)
*G06F 3/041* (2006.01)
*G06F 3/045* (2006.01)

(52) U.S. Cl.

CPC ............ *G01L 1/2287* (2013.01); *G01L 1/225* (2013.01); *G06F 3/041* (2013.01); *G06F 3/04144* (2019.05); *G06F 3/0416* (2013.01); *G06F 3/045* (2013.01)

(58) Field of Classification Search

CPC ....... G01L 1/225; G01L 1/2293; G06F 3/041; G06F 3/0412; G06F 3/0414; G06F 3/04144; G06F 3/0416; G06F 3/04164; G06F 3/04166

See application file for complete search history.

(56) References Cited

U.S. PATENT DOCUMENTS

| | | | | |
|---|---|---|---|---|
| 9,791,989 B2 * | 10/2017 | Hong | G09G 3/3233 | |
| 10,372,278 B2 * | 8/2019 | Ikeda | H10K 59/131 | |
| 10,866,449 B2 * | 12/2020 | Tominaga | G09G 3/3666 | |
| 12,153,764 B1 * | 11/2024 | Smith | G06F 3/0441 | |
| 12,416,991 B2 * | 9/2025 | Lee | G06F 3/04166 | |
| 2010/0033448 A1 * | 2/2010 | Koito | G06F 3/0412 | 349/126 |
| 2010/0302204 A1 * | 12/2010 | Miyayama | G06F 3/0446 | 345/174 |
| 2014/0062941 A1 * | 3/2014 | Park | G06F 3/045 | 345/174 |
| 2015/0091859 A1 * | 4/2015 | Rosenberg | G06F 3/0446 | 345/174 |
| 2016/0012791 A1 * | 1/2016 | Hsieh | G09G 3/3648 | 345/98 |
| 2017/0308221 A1 * | 10/2017 | Li | G06F 3/0446 | |
| 2021/0190607 A1 * | 6/2021 | Kinjo | G01L 1/2293 | |

FOREIGN PATENT DOCUMENTS

JP 2018-146489 A 9/2018

* cited by examiner

*Primary Examiner* — Herbert K Roberts
(74) *Attorney, Agent, or Firm* — K&L Gates LLP

(57) ABSTRACT

A force detection device includes a force sensor having a detection surface to which force is applied, and a drive controller configured to control drive of the force sensor. The force sensor includes a base, a first circuit formation layer, a sensor layer, and a second circuit formation layer stacked in order in an orthogonal direction orthogonal to the detection surface.

3 Claims, 11 Drawing Sheets

FORCE DETECTION DEVICE

CROSS-REFERENCE TO RELATED APPLICATION

This application claims the benefit of priority from Japanese Patent Application No. 2023-094103 filed on Jun. 7, 2023, the entire contents of which are incorporated herein by reference.

BACKGROUND

1. Technical Field

The present invention relates to a force detection device.

2. Description of the Related Art

Force detection devices include a force sensor to which force is applied and a drive controller that controls the drive of the force sensor. The force sensor described in Japanese Patent Application Laid-open Publication No. 2018-146489 includes a circuit formation layer provided with a plurality of inspection electrodes, a common electrode facing the detection electrodes, and a sensor layer sandwiched between the detection electrodes and the common electrode. In a state where no force is applied to the force sensor, the sensor layer is separated from the detection electrodes. When force is applied to the force sensor, the sensor layer moves toward and comes into contact with the detection electrodes. As a result, a current flows from the common electrode to the detection electrodes. The current (detection result) input to the detection electrodes is transmitted to the drive controller via signal lines.

There has recently been a desire to increase the number of times of force detection per unit time.

An object of the present invention is to provide a force detection device that can increase the number of times of force detection per unit time.

SUMMARY

A force detection device according to an embodiment of the present disclosure includes a force sensor having a detection surface to which force is applied, and a drive controller configured to control drive of the force sensor. The force sensor includes a base, a first circuit formation layer, a sensor layer, and a second circuit formation layer stacked in order in an orthogonal direction orthogonal to the detection surface, the first circuit formation layer includes a first surface facing the sensor layer, a plurality of first detection electrodes disposed on the first surface and arrayed in a first direction parallel to the detection surface and a second direction parallel to the detection surface and intersecting the first direction, a plurality of first switching elements provided to a corresponding one of the first detection electrodes, a plurality of first gate lines extending in the first direction, provided in the second direction, and coupled to the first switching elements, and a first gate line drive circuit configured to drive the first gate lines, the second circuit formation layer includes a second surface facing the sensor layer, a plurality of second detection electrodes disposed on the second surface and arrayed in the first direction and the second direction, a plurality of second switching elements provided to a corresponding one of the second detection electrodes, a plurality of second gate lines extending in the first direction, provided in the second direction, and coupled to the second switching elements, and a second gate line drive circuit configured to drive the second gate lines, the first detection electrodes and the second detection electrodes overlap one another when viewed from the orthogonal direction, the drive controller selects the first gate lines in order from a first side in the second direction when detecting the force in the first circuit formation layer, selects the second gate lines in order from the first side in the second direction when detecting the force in the second circuit formation layer, and selects, when an n-th first gate line from the first side in the second direction is selected, the second gate line other than an n-th second gate line from the first side in the second direction.

DETAILED DESCRIPTION

Figure 1:
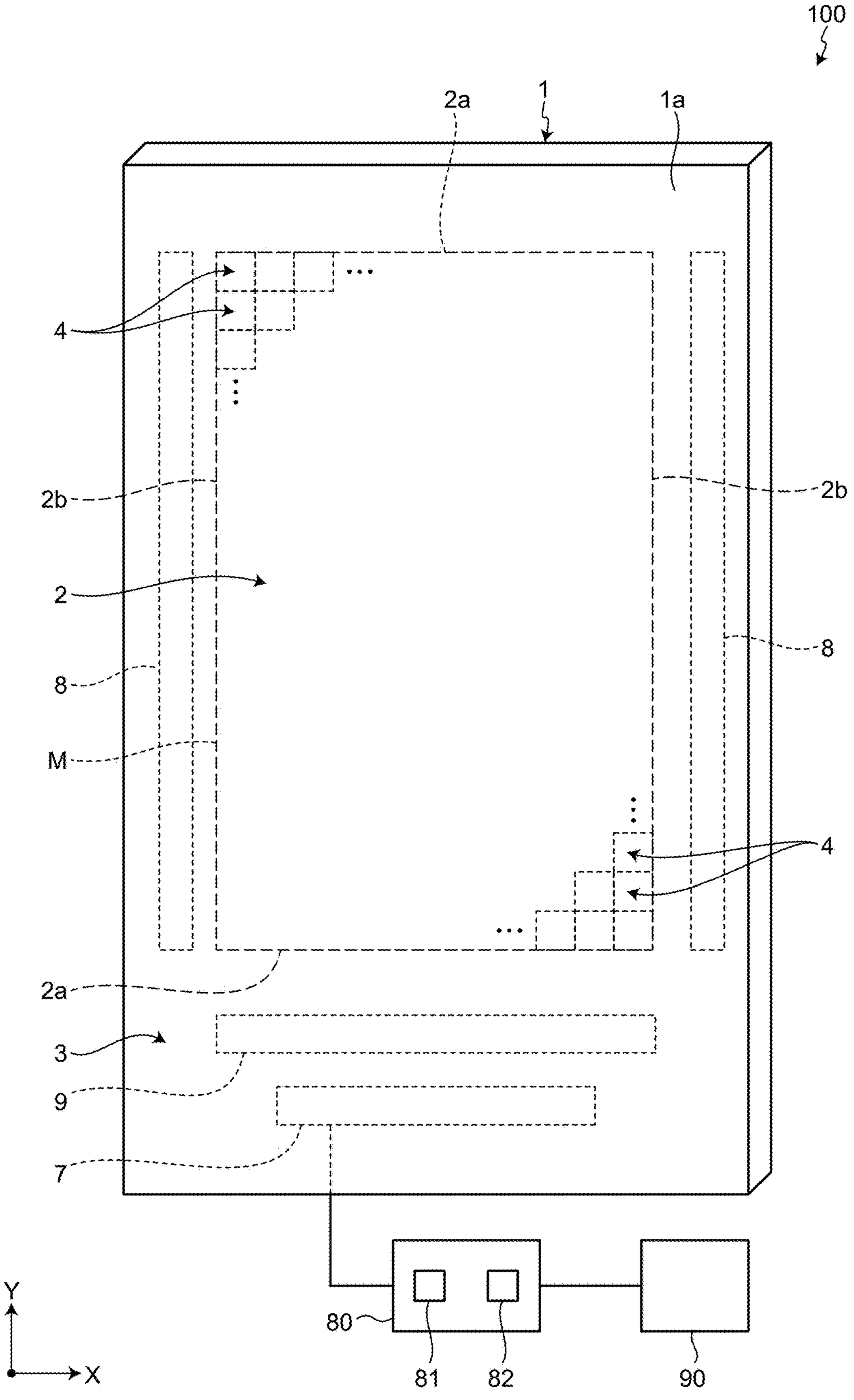
FIG. 1 is a perspective view schematically illustrating a force detection device according to an embodiment.

Exemplary aspects (embodiments) to embody a force detection device according to the present disclosure are described below in greater detail with reference to the accompanying drawings. The contents described in the embodiments are not intended to limit the present disclosure. Components described below include components easily conceivable by those skilled in the art and components substantially identical therewith. Furthermore, the components described below may be appropriately combined. What is disclosed herein is given by way of example only, and appropriate modifications made without departing from the spirit of the present invention and easily conceivable by those skilled in the art naturally fall within the scope of the present disclosure. To simplify the explanation, the drawings may possibly illustrate the width, the thickness, the shape, and other elements of each unit more schematically than those in the actual aspect. These elements, however, are given by way of example only and are not intended to limit interpretation of the present disclosure. In the present specification and the drawings, components similar to those previously described with reference to previous drawings are denoted by like reference numerals, and detailed explanation thereof may be appropriately omitted.

To describe an aspect regarding a certain structure on which another structure is disposed in the present specification and the claims, when "on" is simply used, it indicates both the following cases unless otherwise noted: a case where the other structure is disposed directly on and in contact with the certain structure, and a case where the other structure is disposed on the certain structure with yet another structure interposed therebetween.

First Embodiment

FIG. 1 is a perspective view schematically illustrating a force detection device according to an embodiment. As illustrated in FIG. 1, a force detection device 100 includes a force sensor 1 and a control substrate 80 that controls the operations of the force sensor 1. The control substrate 80 is provided with a control circuit 81 and a power supply circuit 82. The control substrate 80 is coupled to a host 90. The host 90 is a host control device that controls the force detection device 100.

One surface of the force sensor 1 is a detection surface 1*a* for detecting force. The force sensor 1 is formed in a plate shape with a small thickness in an orthogonal direction orthogonal to the detection surface 1*a*. When viewed from the orthogonal direction, the force sensor 1 is divided into a detection region 2 for detecting force and a peripheral region 3 not for detecting force. The detection region 2 is positioned at the center of the force sensor 1. The peripheral region 3 is formed in a frame shape and surrounds the outer periphery of the detection region 2.

The detection region 2 is formed in a rectangular shape in plan view. An outer frame M of the detection region 2 has a pair of short sides 2*a* and a pair of long sides 2*b*. In the following description, the direction parallel to the detection surface 1*a* and parallel to the short side 2*a* is referred to as a first direction X. The direction parallel to the detection surface 1*a* and parallel to the long side 2*b* is referred to as a second direction Y. Thus, the second direction Y is a direction orthogonal to (intersecting) the first direction X.

The detection region 2 is divided into a plurality of individual detection regions 4. In other words, the detection region 2 is composed of the individual detection regions 4, and force values are detected in the respective individual detection regions 4. The individual detection regions 4 are arrayed in the first direction X and the second direction Y.

Figure 2:
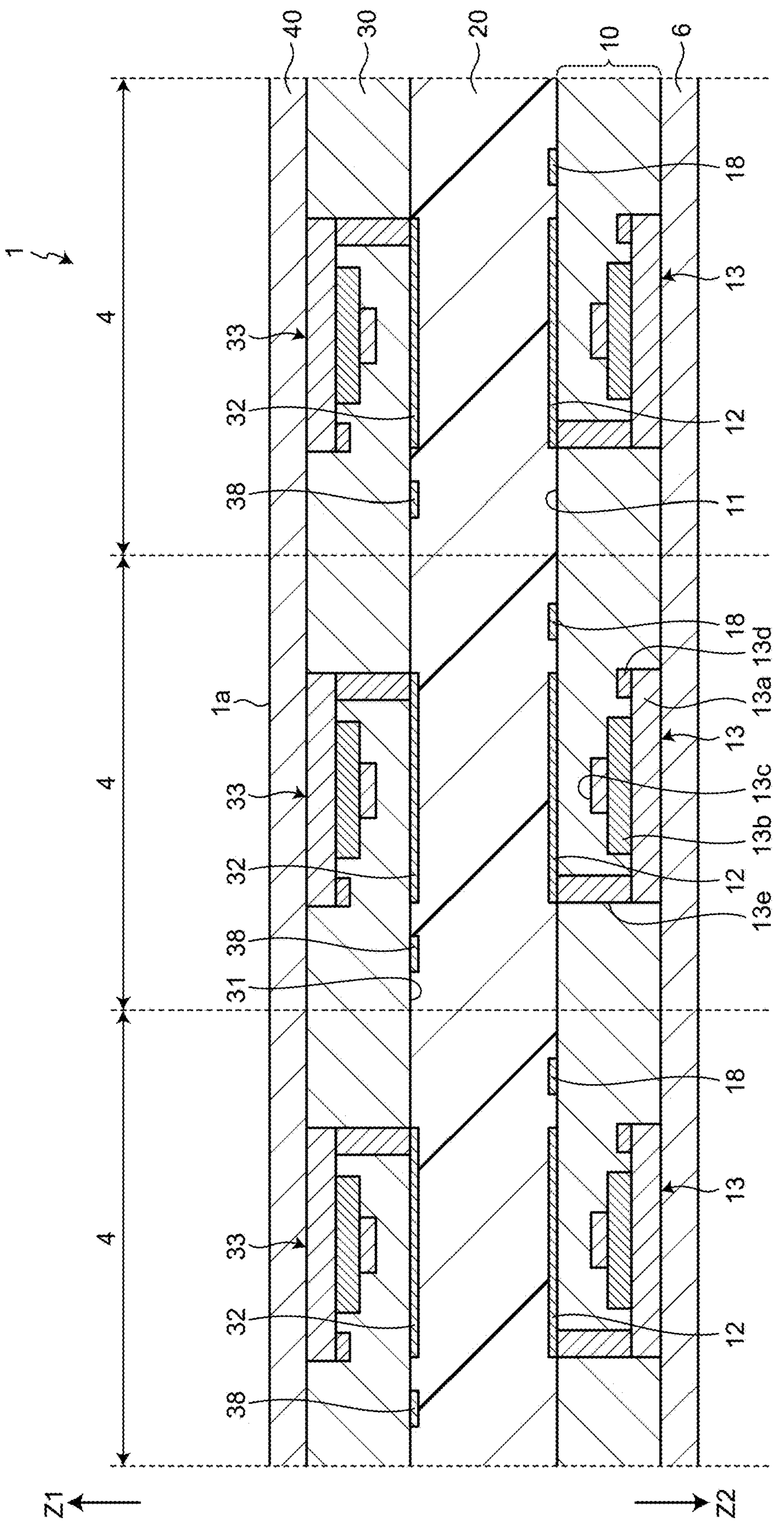
FIG. 2 is a schematic of a section of a force sensor.

FIG. 2 is a schematic of a section of the force sensor. As illustrated in FIG. 2, the force sensor 1 includes a substrate 6, a first circuit formation layer 10, a sensor layer 20, a second circuit formation layer 30, and a protective layer 40 stacked in order in the orthogonal direction.

In the following description, in the orthogonal direction, the direction in which the second circuit formation layer 30 is disposed when viewed from the first circuit formation layer 10 is referred to as a first orthogonal direction Z1. The direction opposite to the first orthogonal direction Z1 is referred to as a second orthogonal direction Z2. Viewing from the first orthogonal direction Z1 is referred to as plan view.

The substrate 6 is a base that supports the first circuit formation layer 10 and is made of material hard to deform when a load is applied thereto. The substrate 6 is an insulating substrate. The substrate 6 is a glass substrate or a resin substrate, for example.

The first circuit formation layer 10 is stacked on and integrated with the substrate 6. The first circuit formation layer 10 has a multilayered structure in which a plurality of insulating layers are stacked, which are not specifically illustrated. The first circuit formation layer 10 has a first surface 11 facing the first orthogonal direction Z1. The first surface 11 is provided with a plurality of first detection electrodes 12 and a plurality of first common electrodes 18.

The first detection electrode 12 is an electrode for detecting force and is made of metal material, such as indium tin oxide (ITO). The first detection electrode 12 is formed in a rectangular shape in plan view. Each first detection electrode 12 is disposed in one corresponding individual detection region 4. In other words, the first detection electrodes 12 are disposed in the detection region 2 and arrayed in the first direction X and the second direction Y.

A plurality of first drive transistors (first switching elements) 13 are provided inside the first circuit formation layer 10. Each first drive transistor 13 is provided to one corresponding individual detection region 4. Therefore, the first drive transistors 13 are disposed in the detection region 2 and arrayed in the first direction X and the second direction Y.

The first circuit formation layer 10 includes various components for driving the first drive transistors 13. Specifically, the first circuit formation layer 10 includes a first coupler 7 (refer to FIG. 1), a first gate line drive circuit 8 (refer to FIG. 1), a first signal line selection circuit 9 (refer to FIG. 1), first gate lines 14 (refer to FIG. 3), and first signal lines 15 (refer to FIG. 3).

As illustrated in FIG. 1, the first coupler 7, the first gate line drive circuit 8, and the first signal line selection circuit 9 are disposed in the peripheral region 3. The first coupler 7 is a component coupled to the control substrate 80 and is a flexible printed circuit board or a rigid circuit board, for example.

The first gate line drive circuit 8 is a circuit that drives a plurality of first gate lines 14 (refer to FIG. 3) based on various control signals supplied from the control circuit 81. The first gate line drive circuit 8 sequentially selects a plurality of first gate lines 14 and supplies gate drive signals to the selected first gate lines 14. The first signal line selection circuit 9 is a switch circuit that sequentially or simultaneously selects a plurality of first signal lines 15 (refer to FIG. 3). The first signal line selection circuit 9 is a multiplexer, for example. The first signal line selection circuit 9 couples the selected first signal lines 15 to the control circuit 81 based on selection signals supplied from the control circuit 81.

Figure 3:
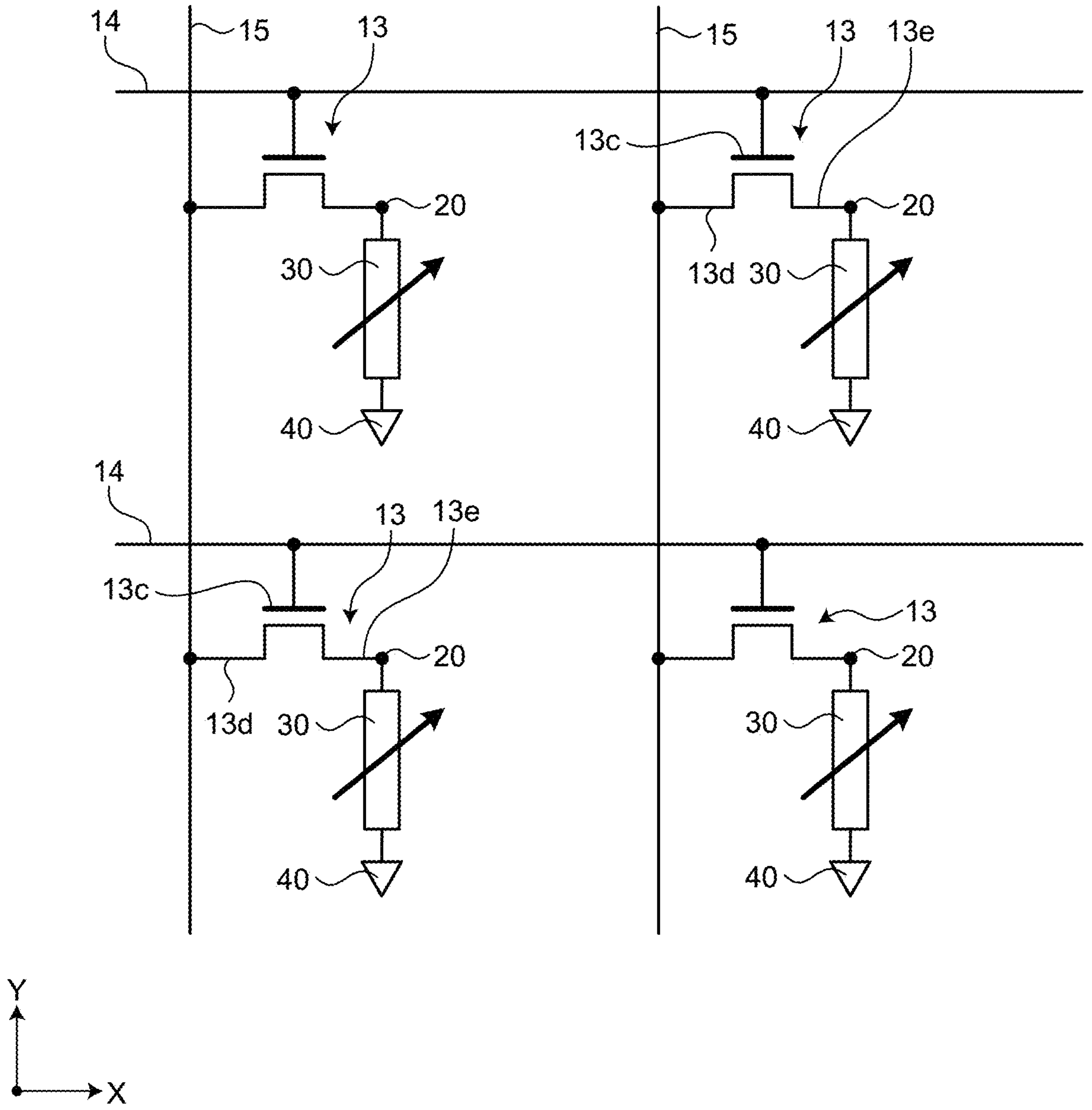
FIG. 3 is a circuit diagram of a circuit configuration of a first circuit formation layer according to the embodiment.

FIG. 3 is a circuit diagram of a circuit configuration of the first circuit formation layer according to the embodiment. As illustrated in FIG. 3, each first gate line 14 extends in the first direction X1 in the detection region 2. A plurality of first gate lines 14 are arrayed in the second direction Y. Each first signal line 15 extends in the second direction Y in the detection region 2. A plurality of first signal lines 15 are arrayed in the first direction X.

The peripheral region 3 of the first circuit formation layer 10 is provided with first common wiring, which is not specifically illustrated. The first common wiring is wiring for supplying a current to the first common electrodes 18. The first common wiring is coupled to the control substrate 80 via the first coupler 7 and is supplied with a certain amount of current from the control circuit 81.

As illustrated in FIG. 2, the first drive transistor 13 includes a semiconductor layer 13*a*, a gate insulating film 13*b*, a gate electrode 13*c*, a drain electrode 13*d*, and a source electrode 13*e*. The source electrode 13*e* is coupled to the first detection electrode 12. The gate electrode 13*c* is coupled to the first gate line 14 (refer to FIG. 3). The drain electrode 13*d* is coupled to the first signal line 15 (refer to FIG. 3).

When the first gate line 14 is driven, the first drive transistor 13 is closed. As a result, an electrical signal (current) input to the first detection electrode 12 is output to the first signal line 15 via the first drive transistor 13. The electrical signal (current) is transmitted from the first signal line 15 to the control circuit 81.

Each first common electrode 18 is provided to one corresponding individual detection region 4. The first common electrode 18 is separated from the first detection electrode 12. The first common electrode 18 is coupled to the first common wiring (not illustrated) by wiring, which is not illustrated, buried in the second orthogonal direction Z2 with respect to the first surface 11 of the first circuit formation layer 10 and is supplied with a certain amount of current.

The sensor layer 20 is formed in a plate shape and extends in the first direction X and the second direction Y. The sensor layer 20 has a first sensor surface 21 facing the first orthogonal direction Z1 and a second sensor surface 22 facing the second orthogonal direction Z2. The second sensor surface 22 covers the first circuit formation layer 10 from the first orthogonal direction Z1 and is in contact with the first detection electrodes 12 and the first common electrodes 18.

The sensor layer 20 is made of material containing conductive fine particles in a highly insulating resin layer. The conductive fine particles are dispersed and separated from each other in the resin layer. As a result, the resistance of the sensor layer 20 is high when the resin layer is not deformed. Therefore, while the sensor layer 20 is in contact with each of the first detection electrodes 12 and the first common electrodes 18, the first detection electrode 12 and the first common electrode 18 are not electrically coupled. By contrast, when the resin layer is deformed, the fine particles come into contact with or in proximity to each other. As a result, the resistance of the sensor layer 20 decreases, and the first detection electrode 12 and the first common electrode 18 are electrically coupled. As the amount of deformation of the resin layer increases, the number of fine particles in contact with each other increases, and the resistance of the sensor layer 20 is significantly reduced. Therefore, the amount of current flowing from the first common electrode 18 to the first detection electrode 12 increases.

Next, the second circuit formation layer 30 is described. The second circuit formation layer 30 has technical elements in common with the first circuit formation layer 10. Therefore, the common technical elements are simply explained in the description of the second circuit formation layer 30.

As illustrated in FIG. 2, the second circuit formation layer 30 has a second surface 31 facing the second orthogonal direction Z2. The second surface 31 is provided with a plurality of second detection electrodes 32 and a plurality of second common electrodes 38. The second detection electrode 32 is formed in a rectangular shape in plan view and has the same size as that of the first detection electrode 12.

Each second detection electrode 32 is disposed in one corresponding individual detection region 4. In other words, the second detection electrodes 32 are disposed in the detection region 2 and arrayed in the first direction X and the second direction Y. Therefore, the first detection electrode 12 and the second detection electrode 32 overlap one another when viewed from the orthogonal direction. In FIG. 2, the entire first detection electrode 12 overlaps the entire second detection electrode 32. In the present disclosure, however, at least part of the first detection electrode 12 may overlap part of the second detection electrode 32.

As illustrated in FIG. 2, a plurality of second drive transistors (second switching elements) 33 are provided inside the second circuit formation layer 30. Each second drive transistor 33 is provided to one corresponding individual detection region 4. The second circuit formation layer 30 includes a second coupler, a second gate line drive circuit, a second signal line selection circuit, second gate lines, and second signal lines for driving the second drive transistors 33, which are not specifically illustrated.

Each second common electrode 38 is provided to one corresponding individual detection region 4. The second common electrode 38 is separated from the second detection electrode 32. The second common electrode 38 is coupled to second common wiring (not illustrated) by wiring, which is not illustrated, buried in the second circuit formation layer 30. The second common wiring is provided in the peripheral region of the second circuit formation layer 30. The second common wiring is coupled to the control substrate 80 via the second coupler and is supplied with a certain amount of current from the control circuit 81. Therefore, the second common electrode 38 is supplied with a certain amount of current.

The second circuit formation layer 30 covers the first sensor surface 21 of the sensor layer 20 from the first orthogonal direction Z1. Therefore, the second detection electrodes 32 and the second common electrodes 38 are in contact with the first sensor surface 21 of the sensor layer 20.

The protective layer 40 is made of elastically deformable insulating material, such as rubber and resin. The surface of the protective layer 40 facing the first orthogonal direction Z1 serves as the detection surface 1*a*. The protective layer 40 is not necessarily required in the present disclosure. In other words, the surface of the second circuit formation layer 30 facing the first orthogonal direction Z1 may serve as the detection surface 1*a*.

Figure 4:
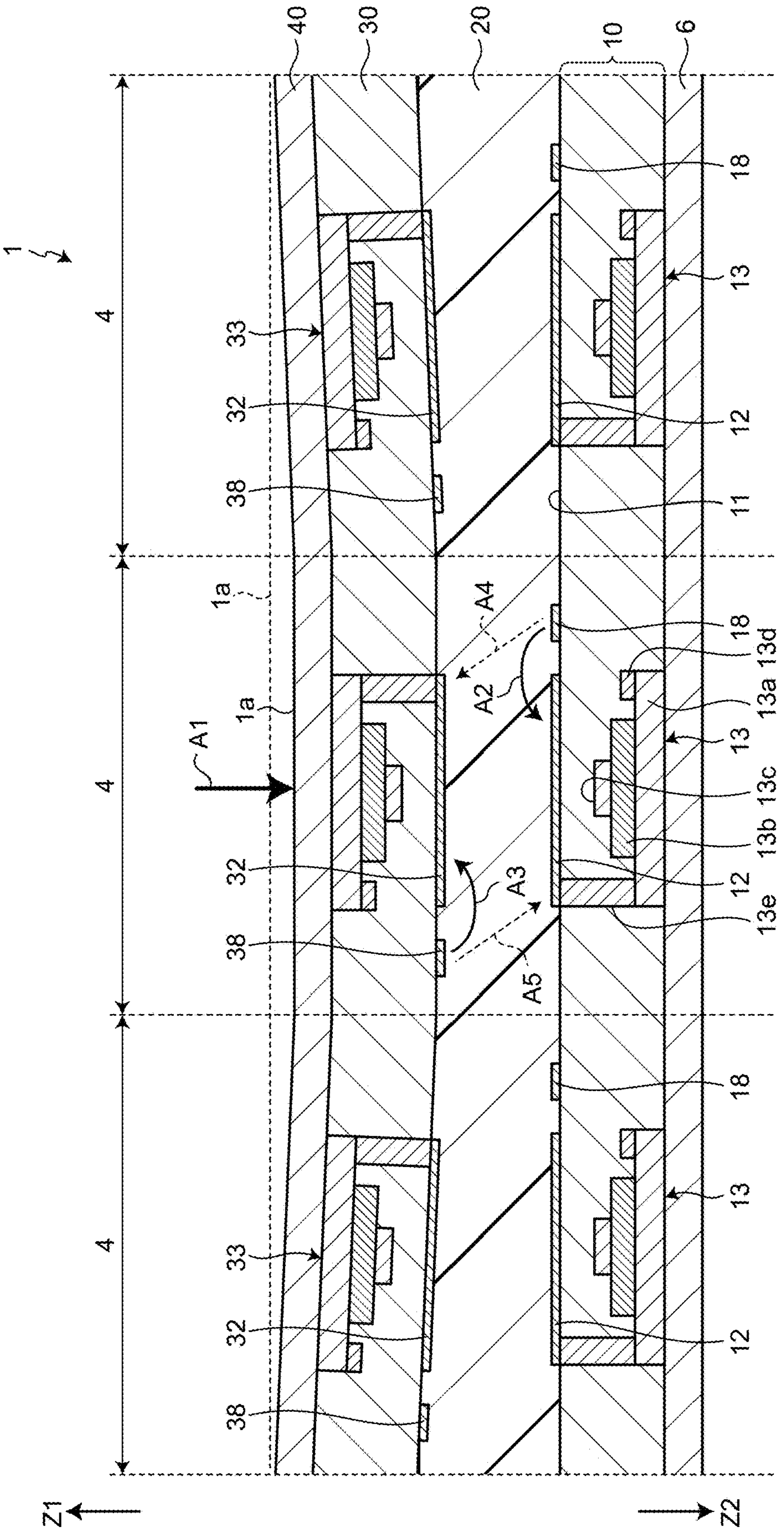
FIG. 4 is a schematic of a state where force is applied to a detection surface of the force sensor according to the embodiment.

FIG. 4 is a schematic of a state where force is applied to the detection surface of the force sensor according to the embodiment. The following describes a case where force is applied to the force sensor 1. As illustrated in FIG. 4, when force (load in the second orthogonal direction Z2, refer to arrow A1 in FIG. 4) is applied to the detection surface 1*a*, the force is transmitted to the sensor layer 20 via the protective layer 40 and the second circuit formation layer 30. The first sensor surface 21 of the sensor layer 20 is depressed in the second orthogonal direction Z2, and the thickness of the sensor layer 20 in the orthogonal direction decreases.

As a result, the resistance of the sensor layer 20 decreases, and the first detection electrode 12 and the first common electrode 18 are electrically coupled. A current flows from the first common electrode 18 to the first detection electrode 12 (refer to arrow A2). The current flowing to the first detection electrode 12 is transmitted to the control circuit 81 via the first signal line 15. The second detection electrode 32 and the second common electrode 38 are also electrically coupled, and a current flows from the second common electrode 38 to the second detection electrode 32 (refer to arrow A3). The current flowing to the second detection electrode 32 is transmitted to the control circuit 81 via the second signal line (not illustrated).

As described above, when force is applied to the detection surface 1*a*, force is detected in each of the first circuit formation layer 10 and the second circuit formation layer 30. One individual detection region 4 is provided with the first detection electrode 12 and the second detection electrode 32. Therefore, the force applied to each of the individual detection regions 4 can be detected by the first circuit formation layer 10 and the second circuit formation layer 30.

As the force (refer to arrow A1) increases, the amount of deformation of the sensor layer 20 increases, and the amount of reduction in the resistance of the sensor layer 20 increases. In other words, the magnitude of the applied force can be detected by measuring the value of the current flowing to the first detection electrodes 12 and the second detection electrodes 32.

As illustrated in FIG. 1, the control circuit 81 provided to the control substrate 80 is a control integrated circuit (control IC). The power supply circuit 82 supplies electric power to the control circuit 81. As a result, the control circuit 81 can generate signals to be supplied to the force sensor 1.

Figure 5:
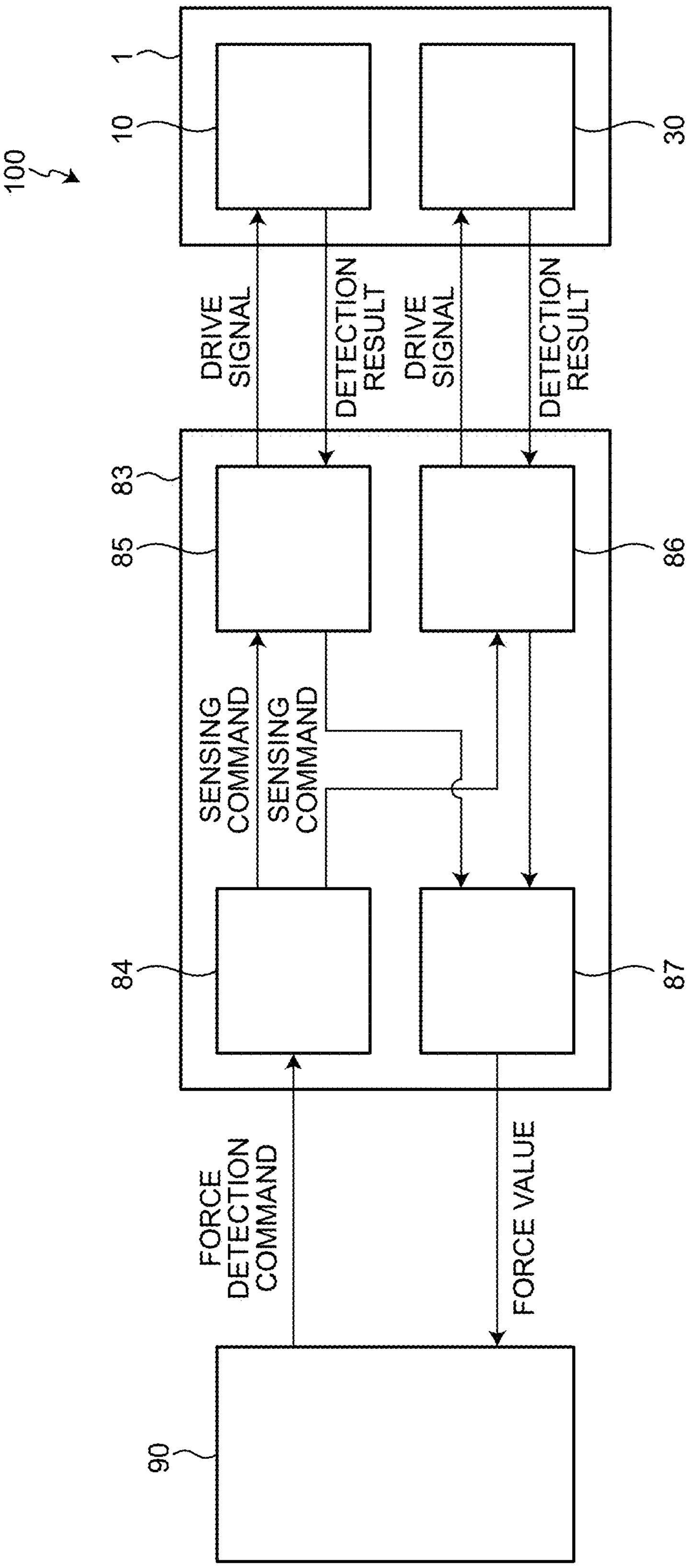
FIG. 5 is a block diagram of a configuration example of the force detection device according to the embodiment.

FIG. 5 is a block diagram of a configuration example of the force detection device according to the embodiment. The control circuit 81 and the power supply circuit 82 constitute a drive controller 83. The drive controller 83 includes a timing controller 84, a first drive controller 85, a second drive controller 86, and a data transmitter 87.

The timing controller 84 receives a force detection command from the host 90 and commands the first drive controller 85 and the second drive controller 86 to perform sensing. The timing controller 84 deviates the timing of the sensing command to the first drive controller 85 from the timing of the sensing command to the second drive controller 86.

When receiving the sensing command, the first drive controller 85 supplies drive signals to the first gate line drive circuit 8 and the first signal line selection circuit 9. In the first circuit formation layer 10 according to the present embodiment, the number of first gate lines 14 arrayed in the second direction Y is assumed to be K. The arrangement order of the gate lines (the first gate lines 14 and the second gate lines) is counted from one side in the second direction Y, and being disposed at the Q-th position is referred to as "Q-th row", for example.

The first drive controller 85 first drives the first gate line 14 of the first row. The first drive controller 85 then drives the second gate line of the second row. In other words, the first drive controller 85 drives the first gate lines 14 one by one in order from one side to the other in the second direction Y and finally drives the first gate line 14 of the K-th row disposed at the other end in the second direction Y. As a result, the first circuit formation layer 10 detects the force applied to each of the individual detection regions 4. The first drive controller 85 receives the results of detection (force values (current values) of the respective individual detection regions 4) by the first circuit formation layer 10 and transmits them to the data transmitter 87.

When receiving the sensing command, the second drive controller 86 supplies drive signals to the second gate drive circuit (not illustrated) and the second signal line selection circuit (not illustrated). In the second circuit formation layer 30, the number of second gate lines (not illustrated) arrayed in the second direction Y is assumed to be L. The number K of first gate lines 14 and the number L of second gate lines are equal (K=L). Therefore, the second detection electrodes 32 coupled to the second gate line of the first row are disposed in the individual detection regions 4 of the first row from one side in the second direction Y out of the individual detection regions 4 and face the first detection electrodes 12 coupled to the first gate line 14 of the first row. The second detection electrodes 32 coupled to the second gate line of the L-th row are disposed in the individual detection regions 4 of the L-th (K-th) row from one side in the second direction Y out of the individual detection regions 4 and face the first detection electrodes 12 coupled to the first gate line 14 of the K-th row.

The driving method of the second drive controller 86 is the same as that of the first drive controller 85, and the second drive controller 86 first drives the second gate line of the first row. The second drive controller 86 then drives the second gate line of the second row. Thus, the second drive controller 86 drives the second gate lines one by one in order from one side to the other in the second direction Y and finally drives the second gate line of the L-th row disposed at the other end in the second direction Y. As a result, the second circuit formation layer 30 detects the force applied to each of the individual detection regions 4. The second drive controller 86 receives the results of detection (force values (current values) of the respective individual detection regions 4) by the second circuit formation layer 30 and transmits them to the data transmitter 87.

The data transmitter 87 receives the detection results of the first circuit formation layer 10 and the second circuit formation layer 30 and transmits them to the host 90.

Figure 6:
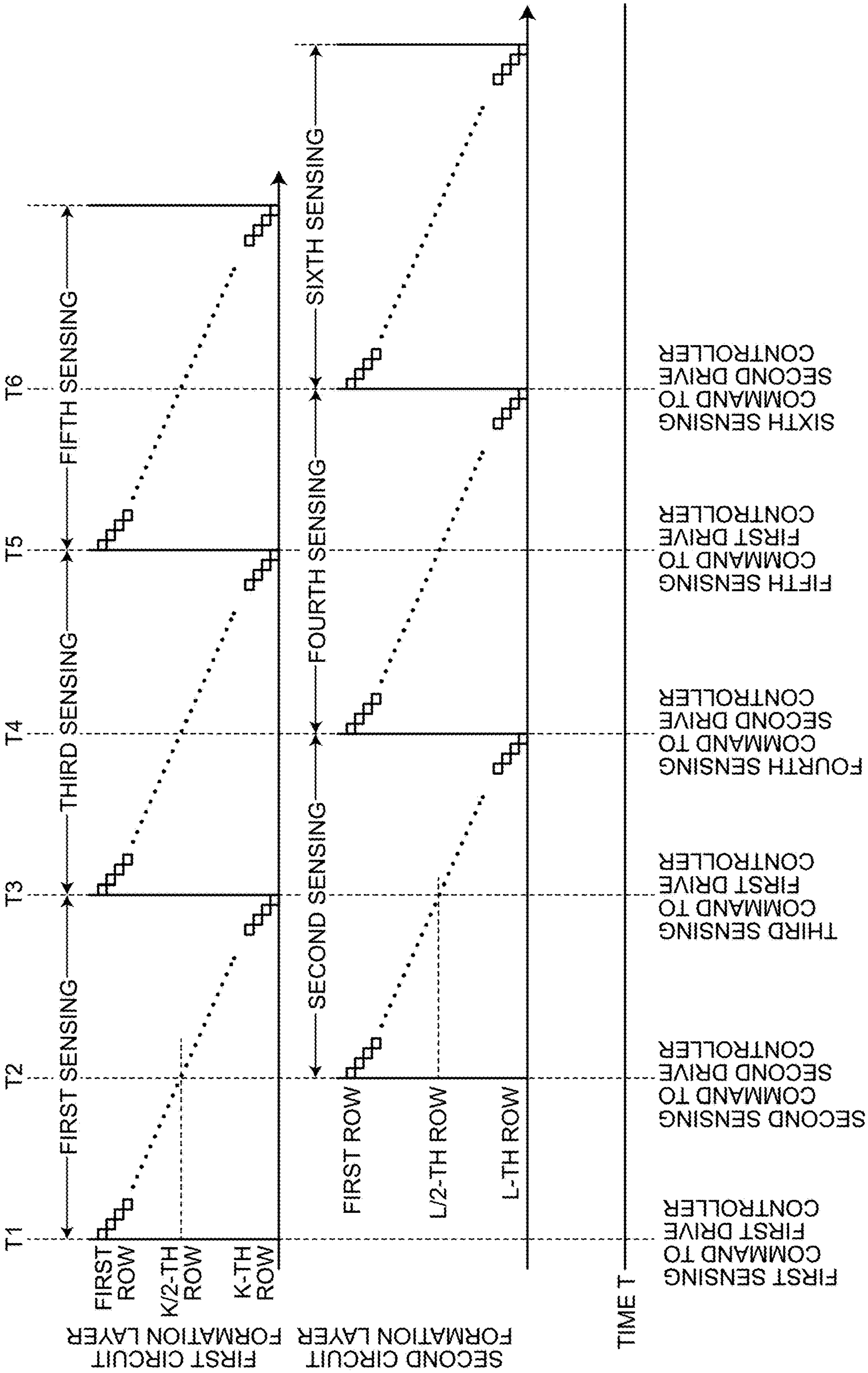
FIG. 6 is a timing chart of the operations of the force detection device according to the embodiment.
Figure 8:
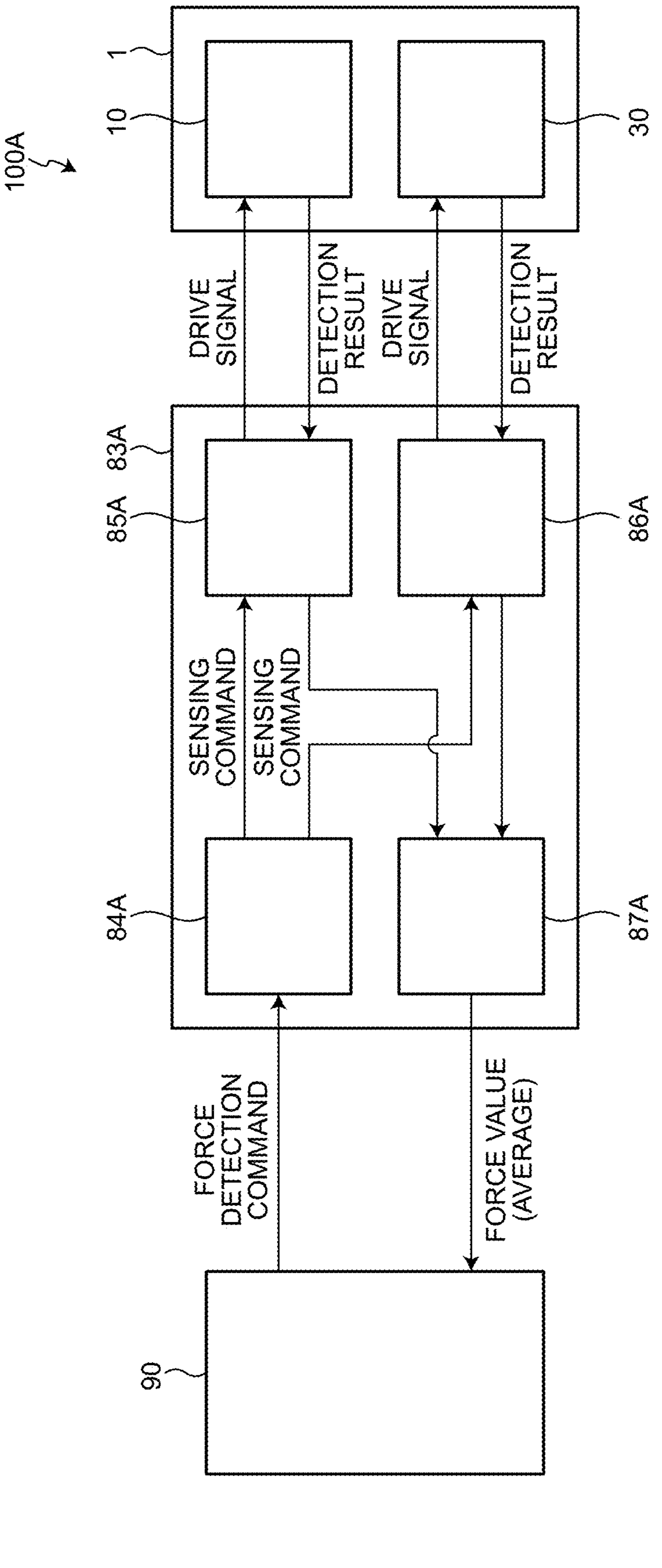
FIG. 8 is a block diagram of a configuration example of the force detection device according to the embodiment.

FIG. 6 is a timing chart of the operations of the force detection device according to the embodiment. Next, an example of the operations of the force detection device according to the first embodiment is described with reference to FIG. 6. The following describes an example where the host 90 issues a force detection command for the timing controller 84 to detect force six times in a row as illustrated in FIG. 8. With such a plurality of force detection commands, changes over time in the force applied to the force sensor 1 can be detected. The time (force detection time) for detecting the force applied to each of the individual detection regions 4 by the first circuit formation layer 10 and the time (force detection time) for detecting the force applied to each of the individual detection regions 4 by the second circuit formation layer 30 are the same period of time.

The timing controller 84 generates six sensing commands (a first sensing command, a second sensing command, a third sensing command, a fourth sensing command, a fifth sensing command, and a sixth sensing command). The timing controller 84 alternately transmits six sensing commands to the first drive controller 85 and the second drive controller 86. The time interval for transmitting the six sensing commands is half of the force detection time (half of the same period of time). Therefore, the first drive controller 85 receives the sensing commands (the first sensing command, the third sensing command, and the fifth sensing command) at time T1, time T3, and time T5. The second drive controller 86 receives the sensing commands (the second sensing command, the fourth sensing command, and the sixth sensing command) at time T2, time T4, and time T6.

Thus, the second circuit formation layer 30 starts to detect force from time T2. In other words, the second gate line of the first row of the second circuit formation layer 30 is driven from time T2. At time T2, half of the force detection time has elapsed since the first sensing command. Therefore, the first gate line 14 of the K/2-th row is driven in the first circuit formation layer 10.

Similarly, at time T3, the first circuit formation layer 10 drives the first gate line 14 of the first row by the third sensing command. At time T3, the second circuit formation layer 30 drives the second gate line (not illustrated) of the L/2-th row. Therefore, the first circuit formation layer 10 and the second circuit formation layer 30 drive the gate lines with different numbers counted from one side in the second direction Y. At each of time T4, time T5, and time T6, the gate line driven in the first circuit formation layer 10 and the gate line driven in the second circuit formation layer 30 are different in the second direction Y. Thus, the gate lines driven in the first circuit formation layer 10 and the second circuit formation layer 30 are different in the second direction Y.

As described above, the first circuit formation layer 10 and the second circuit formation layer 30 according to the first embodiment can independently detect the force applied to the force sensor 1. The conventional force sensor provided with a single circuit formation layer performs the second sensing after the first sensing is completed. By contrast, the present embodiment can perform the second sensing before the first sensing is completed. Therefore, the number of times of force detection per unit time increases, whereby the detection time of the force sensor 1 can be shortened.

If the first circuit formation layer 10 and the second circuit formation layer 30 perform the sensing simultaneously, the gate lines of the same row are driven. Therefore, as illustrated in FIG. 4, a current may possibly flow from the first common electrode 18 of the first circuit formation layer 10 to the second detection electrode 32 of the second circuit formation layer 30 (refer to arrow A4 in FIG. 4) or from the second common electrode 38 of the second circuit formation layer 30 to the first detection electrode 12 of the first circuit formation layer 10 (refer to arrow A5 in FIG. 4).

By contrast, according to the present embodiment, when the first gate line 14 driven in the first circuit formation layer 10 is the n-th first gate line (n-th row) counted from one side in the second direction Y, the second gate line driven in the second circuit formation layer 30 is the (n+ (L/2))-th second gate line ((n+ (L/2))-th row) or the (n−(L/2))-th second gate line ((n−(L/2))-th row) counted from one side in the second direction Y. In other words, when the n-th first gate line 14 counted from one side in the second direction Y is driven, the second gate line other than the n-th one counted from one side in the second direction Y is driven. This configuration prevents a current from flowing from the first common electrode 18 to the second detection electrode 32 (refer to arrow A4 in FIG. 4) or from the second common electrode 38 to the first detection electrode 12 (refer to arrow A5 in FIG. 4). Therefore, the reliability of the sensing results is not compromised.

While the first embodiment has been described above, the present disclosure is not limited to the example described in the first embodiment. For example, in the first embodiment, a plurality of force detection commands transmitted from the host 90 are distributed to the first circuit formation layer 10 and the second circuit formation layer 30 as the sensing commands. Alternatively, after the reception of one force detection command from the host 90, a plurality of detection operations may be performed to calculate the average of the force. The details are explained below with reference to a comparative example.

The force detection device 100 according to the first embodiment sequentially or simultaneously selects a plurality of signal lines while one gate line is being driven. As a result, the current values (detection results) are read from the detection electrodes coupled to the gate line. In the first embodiment, the number of reading operations (detection operations) performed while one gate line is being driven is one. With this driving method, noise may possibly be input during the reading because the number of reading operations (detection operations) is one. Therefore, the reliability of the detected force value is low.

Figure 7:
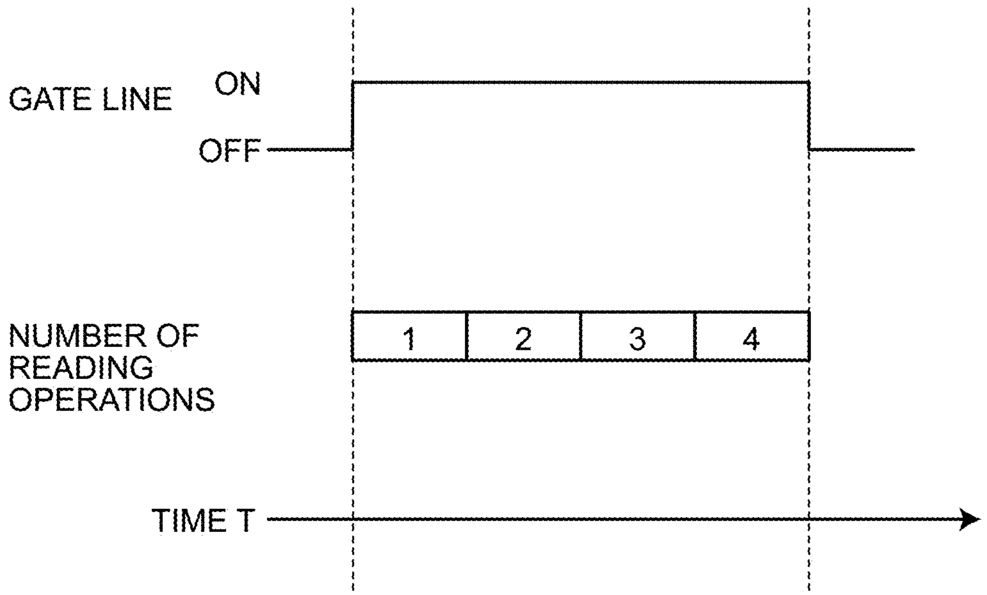
FIG. 7 is a schematic of an example of the drive of the force sensor according to a comparative example.

FIG. 7 is a schematic of an example of the drive of the force sensor according to the comparative example. In the comparative example, as illustrated in FIG. 7, a plurality of (four in the comparative example) reading operations are performed while one gate line is being driven (while the gate line is "ON" in FIG. 7). In other words, the force sensor repeatedly performs reading the detection results from the detection electrodes and then reading the detection results from the detection electrodes again while one gate line is being driven. As a result, a plurality of (four) detection results are obtained. The average of a plurality of (four) detection results may be calculated and determined to be the force value. With this driving method, if noise is input in one of the reading operations, the effects of the noise are reduced because the average is calculated. Therefore, the reliability of the detected force value is high.

A second embodiment below describes a force detection device 100A that performs four reading operations and determines the average to be the force value. The following describes the second embodiment focusing on the differences from the first embodiment.

Second Embodiment

FIG. 8 is a block diagram of a configuration example of the force detection device according to the embodiment. As illustrated in FIG. 8, the force detection device 100A includes a drive controller 83A instead of a drive controller 83. The drive controller 83A includes a timing controller 84A, a first drive controller 85A, a second drive controller 86A, and a data transmitter 87A.

The first drive controller 85A is different from the first drive controller 85 in that, when receiving a sensing command from the timing controller 84A, the first drive controller 85A selects each of the first signal lines 15 twice to perform the reading operation twice while one first gate line 14 is being driven.

Similarly, the second drive controller 86A is different from the second drive controller 86 in that, when receiving a sensing command, the second drive controller 86A selects each of the second signal lines twice to perform the reading operation twice while one second gate line is being driven.

As described above, in the second embodiment, the four reading operations are distributed such that the first circuit formation layer 10 and the second circuit formation layer 30 each perform two reading operations.

The data transmitter 87A receives a total of four detection results transmitted from the first drive controller 85A and the second drive controller 86A. The data transmitter 87A calculates the average of the four detection results and transmits it to the host 90 as the force value.

The timing controller 84A is different from the timing controller 84 according to the first embodiment in that it generates two sensing commands when receiving one force detection command from the host 90. In other words, the timing controller 84A generates two sensing commands to cause the first circuit formation layer 10 and the second circuit formation layer 30 to perform four reading operations.

Figure 9:
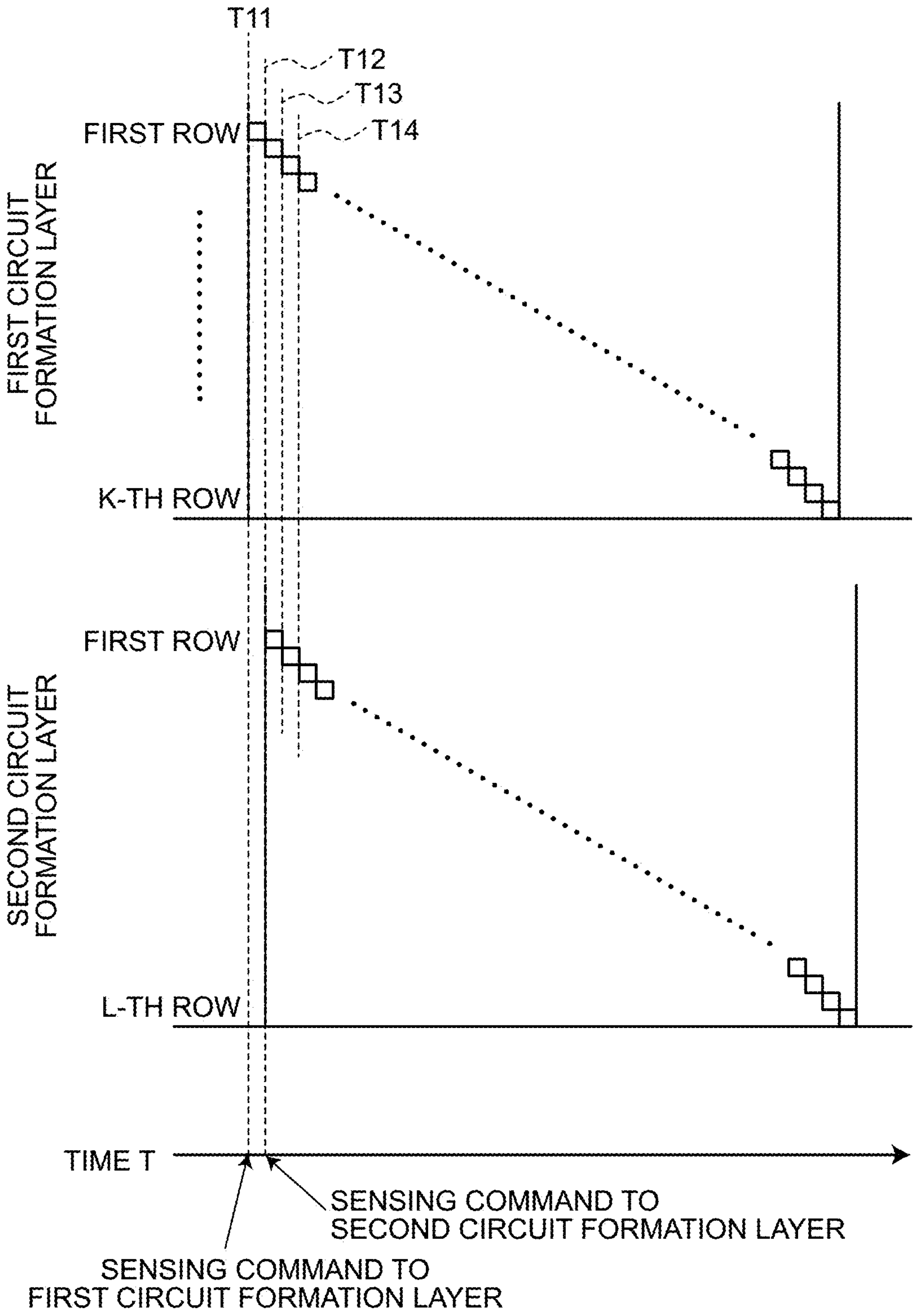
FIG. 9 is a timing chart of the operations of the force detection device according to a second embodiment.

FIG. 9 is a timing chart of the operations of the force detection device according to the second embodiment. The timing of transmitting the sensing to the first drive controller 85A is temporally shifted from the timing of transmitting the sensing to the second drive controller 86. Specifically, as illustrated in FIG. 9, the timing controller 84A transmits the sensing command to the first drive controller 85A at time T11. Subsequently, the timing controller 84A transmits the sensing command to the second drive controller 86A at time T12. The interval between time T11 and time T12 is the time required to drive one gate line and complete two reading operations.

As described above, in the force detection device 100A according to the second embodiment, the first gate line 14 of the first row is driven in the first circuit formation layer 10 from time T11 to time T12. From time T12 to time T13, the first gate line 14 of the second row is driven in the first circuit formation layer 10, and the second gate line of the first row is driven in the second circuit formation layer 30. From time T13 to time T14, the first gate line 14 of the third row is driven in the first circuit formation layer 10, and the second gate line of the second row is driven in the second circuit formation layer 30.

Figure 10:
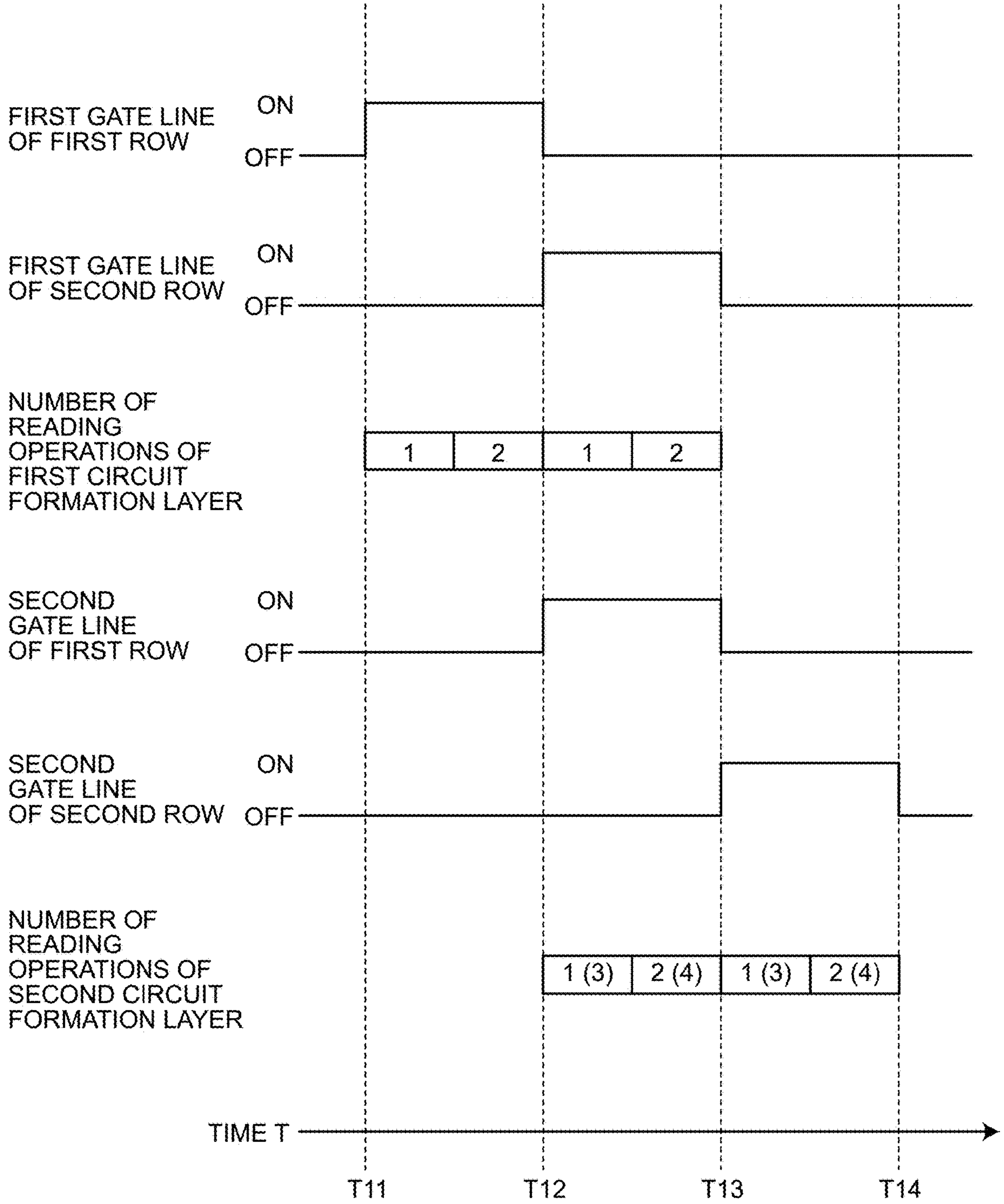
FIG. 10 is a diagram for explaining the reading operations in a first circuit formation layer and the reading operations in a second circuit formation layer according to the second embodiment.

FIG. 10 is a diagram for explaining the reading operations in the first circuit formation layer and the reading operations in the second circuit formation layer according to the second embodiment. As illustrated in FIG. 10, from time T11 to time T12, the first circuit formation layer 10 performs the reading operation twice on the first detection electrodes 12 coupled to the first gate line 14 of the first row. From time T12 to time T13, the second circuit formation layer 30 performs the reading operation twice on the second detection electrodes 32 coupled to the second gate line of the first row. Therefore, the force applied to the individual detection regions 4 of the first row positioned at one end in the second direction Y out of the individual detection regions 4 is detected four times.

From time T12 to time T13, the first circuit formation layer 10 performs the reading operation twice on the first detection electrodes 12 coupled to the first gate line 14 of the second row. From time T13 to time T14, the second circuit formation layer 30 performs the reading operation twice on the second detection electrodes 32 coupled to the second gate line of the second row. Therefore, the force applied to the individual detection regions 4 of the second row is detected four times.

As described above, the first circuit formation layer 10 according to the second embodiment performs the first and the second reading operations, and the second circuit formation layer 30 performs the third and the fourth reading operations. Thus, the force can be detected by each of the first circuit formation layer 10 and the second circuit formation layer 30. Therefore, the number of detection operations is approximately twice the number in the case of a single circuit formation layer, and the amount of detection results per unit time is increased.

According to the second embodiment, when the first gate line 14 driven in the first circuit formation layer 10 is the n-th first gate line (n-th row) counted from one side in the second direction Y, the second gate line driven in the second circuit formation layer 30 is the (n−1)-th second gate line ((n−1)-th row) counted from one side in the second direction Y. In other words, the gate lines driven in the first circuit formation layer 10 and the second circuit formation layer 30 are different by one row in the second direction Y. This configuration prevents a current from flowing from the first common electrode 18 to the second detection electrode 32 (refer to arrow A4 in FIG. 4) or from the second common electrode 38 to the first detection electrode 12 (refer to arrow A5 in FIG. 4).

In the four reading operations, immediately after the second reading operation by the first circuit formation layer 10 is completed, the third reading operation by the second circuit formation layer 30 is performed. This configuration prevents the force value from fluctuating from the end of the second reading operation to the start of the third reading operation. Therefore, the reliability of the force value (average) is high.

With two circuit formation layers, the following driving method may be conceived: the first circuit formation layer 10 reads the force applied to the individual detection regions 4 of odd-numbered rows four times, and the second circuit formation layer 30 reads the force applied to the individual detection regions 4 of even-numbered rows four times. This driving method, however, fails to absorb manufacturing errors in detection capability between the first circuit formation layer 10 and the second circuit formation layer 30. By contrast, in the present embodiment distributes, four reading operations are distributed such that the first circuit formation layer 10 and the second circuit formation layer 30 each perform two reading operations. Therefore, the present embodiment can absorb the manufacturing errors in detection capability between the first circuit formation layer 10 and the second circuit formation layer 30.

While the gate lines driven in the first circuit formation layer 10 and the second circuit formation layer 30 are different by one row in the second direction Y, the driven gate lines according to the present disclosure may be different by two or more rows in the second direction Y. However, the second embodiment is preferable because fluctuations in the force value are less likely to occur.

While the detection is started from the first circuit formation layer 10 according to the second embodiment, it may be started from the second circuit formation layer 30. In this case, when the first gate line 14 driven in the first circuit formation layer 10 is the n-th first gate line (n-th row) counted from one side in the second direction Y, the second gate line driven in the second circuit formation layer 30 is the (n+1)-th second gate line ((n+1)-th row) counted from one side in the second direction Y.

Figure 11:
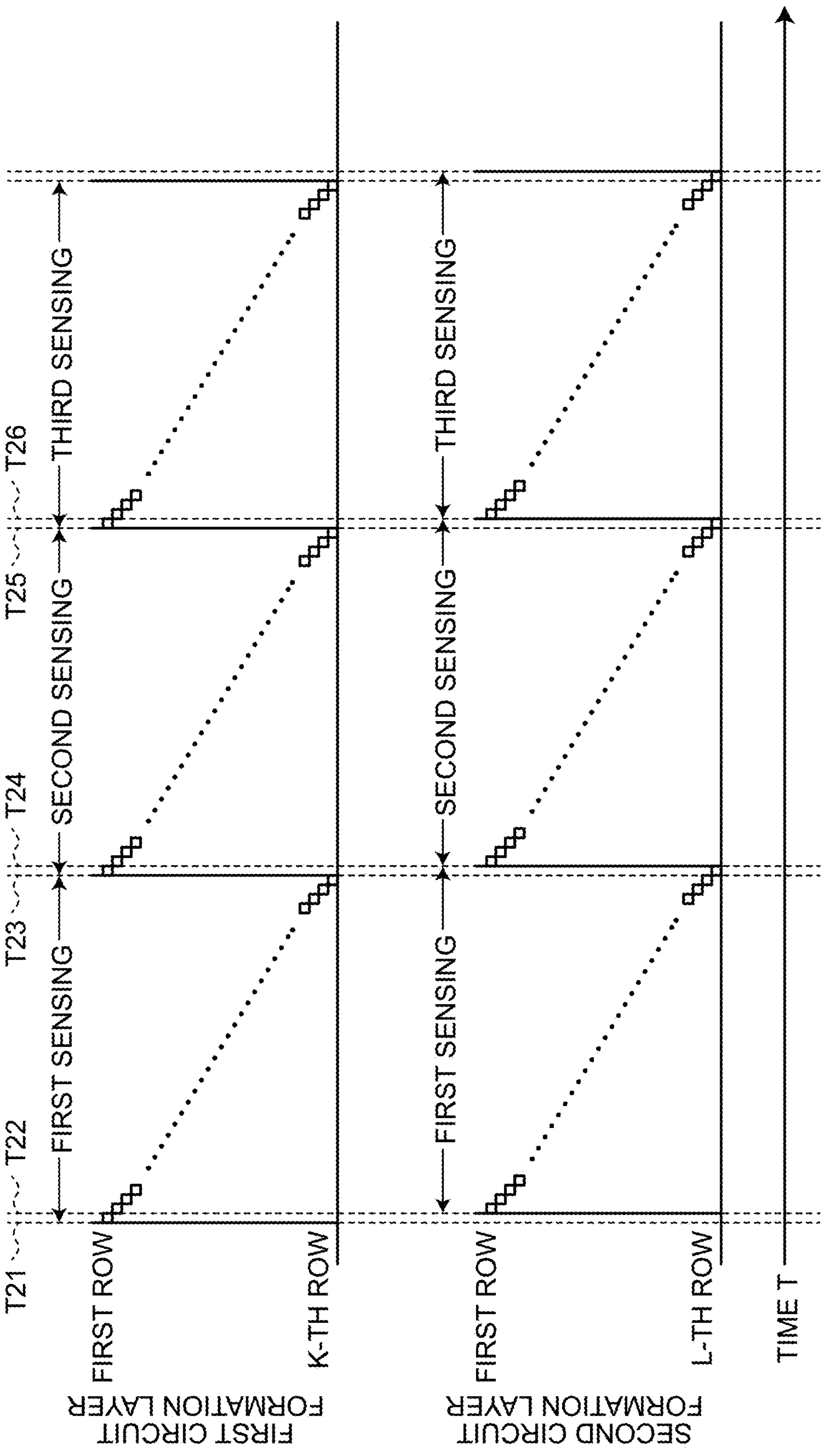
FIG. 11 is a timing chart of the operations of the force detection device according to a modification.

FIG. 11 is a timing chart of the operations of the force detection device according to a modification. The force detection device according to the present disclosure may perform a plurality of detection operations in response to each of a plurality of force detection commands transmitted from the host 90 and calculate and determine the average to be the force value. Specifically, as illustrated in FIG. 11, when receiving three force detection commands transmitted from the host 90, the timing controller 84A generates two first sensing commands. The timing controller 84A transmits one of the first sensing commands to the first circuit formation layer 10 at time T21 and transmits the other to the second circuit formation layer 30 at time T22. The interval between time T21 and time T22 is the time required to drive one gate line and complete two reading operations.

The timing controller 84A generates two second sensing commands. The timing controller 84A transmits one of the second sensing commands to the first circuit formation layer 10 at time T23 and transmits the other to the second circuit formation layer 30 at time T24. Time 23 is the time when the first sensing by the first circuit formation layer 10 is completed. The timing controller 84A generates two third sensing commands. The timing controller 84A transmits one of the third sensing commands to the first circuit formation layer 10 at time T25 and transmits the other to the second circuit formation layer 30 at time T26.

This modification performs detection a total of three times of the first sensing, the second sensing, and the third sensing with intervals interposed therebetween. Therefore, changes over time in the force value can be detected. In addition, four reading operations are performed in each of the first sensing, the second sensing, and the third sensing, and the average is calculated and determined to be the force value. Therefore, the reliability of the information (force value) is high.

While the sensor layer 20 according to the embodiment is made of material containing conductive fine particles in a resin layer, the present disclosure is not limited thereto. For example, the sensor layer may be made of conductive resin, and the detection electrode and the common electrode may be electrically coupled by increasing the contact area between the detection electrode and the common electrode.

What is claimed is:

1. A force detection device comprising:

a force sensor having a detection surface to which force is applied; and a drive controller configured to control drive of the force sensor, wherein the force sensor includes a base, a first circuit formation layer, a sensor layer, and a second circuit formation layer stacked in order in an orthogonal direction orthogonal to the detection surface, the first circuit formation layer includes:

a first surface facing the sensor layer;

a plurality of first detection electrodes disposed on the first surface and arrayed in a first direction parallel to the detection surface and a second direction parallel to the detection surface and intersecting the first direction;

a plurality of first switching elements provided to a corresponding one of the first detection electrodes;

a plurality of first gate lines extending in the first direction, provided in the second direction, and coupled to the first switching elements; and a first gate line drive circuit configured to drive the first gate lines, the second circuit formation layer includes:

a second surface facing the sensor layer;

a plurality of second detection electrodes disposed on the second surface and arrayed in the first direction and the second direction;

a plurality of second switching elements provided to a corresponding one of the second detection electrodes;

a plurality of second gate lines extending in the first direction, provided in the second direction, and coupled to the second switching elements; and a second gate line drive circuit configured to drive the second gate lines, the first detection electrodes and the second detection electrodes overlap one another when viewed from the orthogonal direction, the drive controller:

selects the first gate lines in order from a first side in the second direction when detecting the force in the first circuit formation layer;

selects the second gate lines in order from the first side in the second direction when detecting the force in the second circuit formation layer; and selects, when an n-th first gate line from the first side in the second direction is selected, the second gate line other than an n-th second gate line from the first side in the second direction.

2. The force detection device according to claim 1, wherein a force detection time by the first circuit formation layer and a force detection time by the second circuit formation layer are the same period of time, and a timing of starting force detection by the first circuit formation layer and a timing of starting force detection by the second circuit formation layer are different by half of the same period of time.

3. The force detection device according to claim 1, wherein, when an n-th first gate line from the first side in the second direction is selected, an (n+1)-th or (n−1)-th second gate line from the first side in the second direction is selected.

* * * * *